United States Patent
Wang et al.

(10) Patent No.: US 9,420,494 B2
(45) Date of Patent: *Aug. 16, 2016

(54) METHOD AND SYSTEM FOR INTERMEDIATE NODE QUALITY OF SERVICE NEGOTIATIONS

(71) Applicant: Google Technology Holdings LLC, Mountain View, CA (US)

(72) Inventors: Zheng-Xiang Wang, Beijing (CN); Walter Featherstone, Meysey Hampton (GB)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/537,231

(22) Filed: Nov. 10, 2014

(65) Prior Publication Data

US 2015/0063279 A1   Mar. 5, 2015

Related U.S. Application Data

(63) Continuation of application No. 12/137,820, filed on Jun. 12, 2008, now Pat. No. 8,902,821.

(51) Int. Cl.
   *H04W 28/26* (2009.01)
   *H04W 28/24* (2009.01)
   *H04W 76/04* (2009.01)

(52) U.S. Cl.
   CPC .............. *H04W 28/26* (2013.01); *H04W 28/24* (2013.01); *H04W 76/041* (2013.01)

(58) Field of Classification Search
   None
   See application file for complete search history.

(56) References Cited

U.S. PATENT DOCUMENTS

| | | | |
|---|---|---|---|
| 7,106,718 B2 * | 9/2006 | Oyama | H04L 29/06 370/340 |
| 7,406,078 B2 | 7/2008 | Jeon | |
| 8,902,821 B2 * | 12/2014 | Wang et al. | 370/329 |
| 2002/0010771 A1 * | 1/2002 | Mandato | H04L 12/5695 709/223 |
| 2002/0062379 A1 | 5/2002 | Widegren et al. | |
| 2002/0099854 A1 | 7/2002 | Jorgensen | |
| 2003/0067903 A1 | 4/2003 | Jorgensen | |
| 2003/0202468 A1 | 10/2003 | Cain et al. | |
| 2004/0037269 A1 * | 2/2004 | Lundin | H04L 12/5695 370/352 |
| 2004/0157616 A1 * | 8/2004 | Muniere | H04L 12/5695 455/452.2 |
| 2004/0198365 A1 * | 10/2004 | Verma | H04W 36/0011 455/452.1 |
| 2005/0014510 A1 | 1/2005 | Jeon | |
| 2005/0026616 A1 * | 2/2005 | Cavalli | H04W 36/0083 455/436 |
| 2005/0053094 A1 | 3/2005 | Cain et al. | |
| 2005/0054346 A1 | 3/2005 | Windham et al. | |
| 2005/0094611 A1 * | 5/2005 | Cheong | H04L 12/5695 370/342 |
| 2005/0096063 A1 * | 5/2005 | Muniere | H04W 8/20 455/452.2 |
| 2005/0157660 A1 * | 7/2005 | Mandato | H04L 12/5695 370/254 |

(Continued)

*Primary Examiner* — Ayaz Sheikh
*Assistant Examiner* — Faiyazkhan Ghafoerkhan
(74) *Attorney, Agent, or Firm* — Lerner, David, Littenberg, Krumholz & Mentlik, LLP

(57) ABSTRACT

Disclosed are a method and system for an intermediate node, which negotiates a Quality of Service (QoS) contract with two or more secondary nodes, to maintain a record of previous contract agreements to use as the basis for future contracts and to select the negotiation order with the secondary nodes based on a configurable rule set. The intermediate node selects the secondary node which is deemed to be (predicted as) most restrictive to begin QoS negotiations. The intermediate node dynamically creates for a specific user a new QoS profile to begin the QoS negotiations based on current system loading and historical QoS precedents.

20 Claims, 7 Drawing Sheets

(56) References Cited

U.S. PATENT DOCUMENTS

| | | | |
|---|---|---|---|
| 2005/0169171 A1* | 8/2005 | Cheng | H04L 47/10 370/229 |
| 2005/0232193 A1 | 10/2005 | Jorgensen | |
| 2005/0239458 A1 | 10/2005 | Hurtta | |
| 2006/0045128 A1* | 3/2006 | Madour | H04L 47/10 370/466 |
| 2006/0135172 A1* | 6/2006 | Dronne | H04L 47/10 455/452.2 |
| 2006/0153079 A1* | 7/2006 | Yoon | H04W 28/26 370/235 |
| 2006/0165027 A1* | 7/2006 | Heden | H04L 12/5695 370/328 |
| 2006/0168303 A1* | 7/2006 | Oyama | G06Q 30/0601 709/231 |
| 2006/0195581 A1* | 8/2006 | Vaman | H04L 12/5695 709/226 |
| 2006/0206617 A1* | 9/2006 | Rey | H04L 1/0026 709/231 |
| 2007/0002868 A1* | 1/2007 | Qian | H04W 28/24 370/395.21 |
| 2007/0038736 A1 | 2/2007 | Jorgensen | |
| 2007/0038750 A1 | 2/2007 | Jorgensen | |
| 2007/0038751 A1 | 2/2007 | Jorgensen | |
| 2007/0038752 A1* | 2/2007 | Jorgensen | H04L 1/20 709/226 |
| 2007/0038753 A1 | 2/2007 | Jorgensen | |
| 2007/0050492 A1 | 3/2007 | Jorgensen | |
| 2007/0064709 A1* | 3/2007 | Holmstrom | H04L 65/1006 370/395.2 |
| 2007/0064710 A1* | 3/2007 | Holmstrom | H04W 28/26 370/395.2 |
| 2007/0073805 A1* | 3/2007 | Jorgensen | H04L 1/20 709/203 |
| 2008/0117884 A1 | 5/2008 | Ishii et al. | |
| 2008/0232306 A1 | 9/2008 | Kopplin et al. | |
| 2009/0310613 A1* | 12/2009 | Wang | H04W 28/26 370/400 |
| 2015/0063279 A1* | 3/2015 | Wang | H04W 28/26 370/329 |

\* cited by examiner

US 9,420,494 B2

METHOD AND SYSTEM FOR INTERMEDIATE NODE QUALITY OF SERVICE NEGOTIATIONS

CROSS REFERENCE TO RELATED APPLICATIONS

The present application is a continuation of U.S. patent application Ser. No. 12/137,820, filed Jun. 12, 2008, the disclosure of which is incorporated herein by reference.

TECHNICAL FIELD

The present invention generally relates to cellular mobile communication systems and, in particular, to Quality of Service (QoS) negotiations between an intermediate node and secondary nodes.

DESCRIPTION OF THE RELATED ART

Each of the secondary nodes in a General Packet Radio Service (GPRS) network may have their own QoS provisioning constraints (e.g., limited air interface capacity/capability). Thus, a problem arises as to how an intermediate (middle) node (e.g., the Serving GPRS Support Node (SGSN)) in the GPRS network should go about determining a suitable End-to-End (E2E) Quality of Service (QoS) contract, when that contract has to be negotiated with two or more secondary nodes. For example, the secondary nodes may include a Gateway GPRS Support Node (GGSN) and a packet control unit (PCU). In addition, the contract may have to be dynamically updated based on current network and user capabilities.

When a QoS contract is negotiated across multiple nodes, each node generally records the negotiated QoS. More specifically, the negotiated QoS parameters per connection may be recorded. This may reduce the negotiation time in case the same E2E connection is re-established in the future, such as after the original transfer has been completed or if the connection fails midway through. A reduced negotiation time may be achieved if the recorded QoS profile can be used for the connection or used as a basis for such connection.

This brings a challenge to node negotiations relating to a QoS profile, since the currently recorded QoS profile parameters may be out-of-date. In a GPRS network, the original QoS profile will be recorded and then generally deleted in the secondary node (specifically the PCU within the Base Station Subsystem (BSS)) after a Packet Flow Context (PFC) timer has expired. The PFC is the method through which the SGSN is able to provide the BSS with information relating to the ongoing user data transmission, including the QoS profile of that transmission. A currently recorded QoS profile may provide downgraded services compared to the originally requested QoS profile. Therefore, it is possible at the time of a subsequent request that the conditions have changed such that the QoS afforded by the originally requested QoS profile could now be supported. In order to provide the mobile device with the original QoS afforded by the originally requested QoS profile, the new request by the intermediate node (i.e., the SGSN) would need to include the originally requested QoS. In the case of GPRS, the SGSN should include the originally requested QoS profile in the "Download-BSS-PFC" message. This would allow the secondary node (e.g., PCU) to fully offer the resources currently available. Nonetheless, such a procedure would potentially increase the QoS negotiation times back to their original levels, removing the benefits of the secondary node recording the previous QoS profile.

FIG. 1 is a general flow diagram of a conventional implementation of a GPRS Create-BSS-PFC procedure 100 after a Download-BSS-PFC request message. A problem with the current GPRS Create-BSS-PFC procedure 100 is that the procedure does not specify which QoS contract an intermediate node (i.e., the SGSN) 104 should include in the Create-BSS-PFC-Req message conveyed from the intermediate node 104 to a secondary node, e.g., the Base Station Subsystem (BSS), 102. The Create-BSS-PFC-Req message may be followed by a Create-BSS-PFC-Accept message from the BSS 102 to the SGSN 104.

A further problem is that normally the SGSN uses the currently negotiated QoS contract and not the original QoS requested by the mobile/network. The intermediate node can effectively prevent the secondary node from increasing the offered QoS by imposing an already downgraded QoS profile. In that case, the PCU can not upgrade the QoS (by modifying the BSS-PFC procedure 100) towards the originally requested QoS profile. As a result, resources are not used efficiently and therefore the customer's E2E QoS experience also is not optimized.

BRIEF DESCRIPTION OF THE DRAWINGS

The invention itself will best be understood by reference to the following detailed description of an illustrative embodiment when read in conjunction with the accompanying drawings, wherein.

DETAILED DESCRIPTION OF AN ILLUSTRATIVE EMBODIMENT

Figure 1:
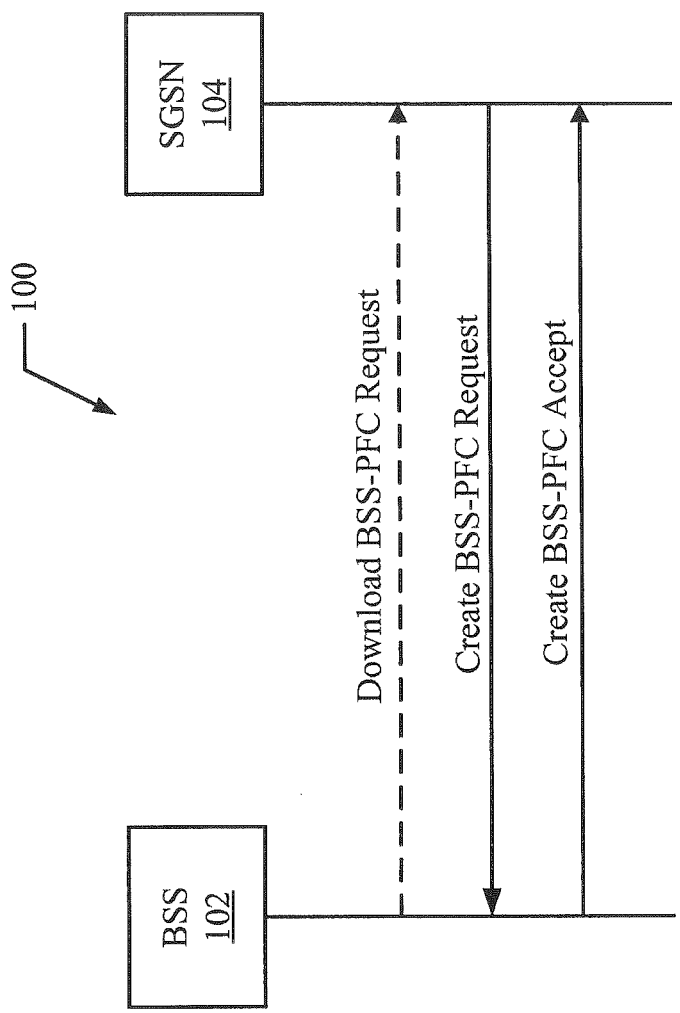
FIG. 1 is a flow diagram of a conventional implementation of the GPRS Create-BSS-PFC procedure after a Download-BSS-PFC request message.

The illustrative embodiments provide a method and system for an intermediate node which negotiates QoS contracts with secondary nodes. The intermediate node maintains a record of previous contract agreements to use as the basis for future contracts and selects the negotiation order with the secondary nodes based on a configurable rule set.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

Figure 2:
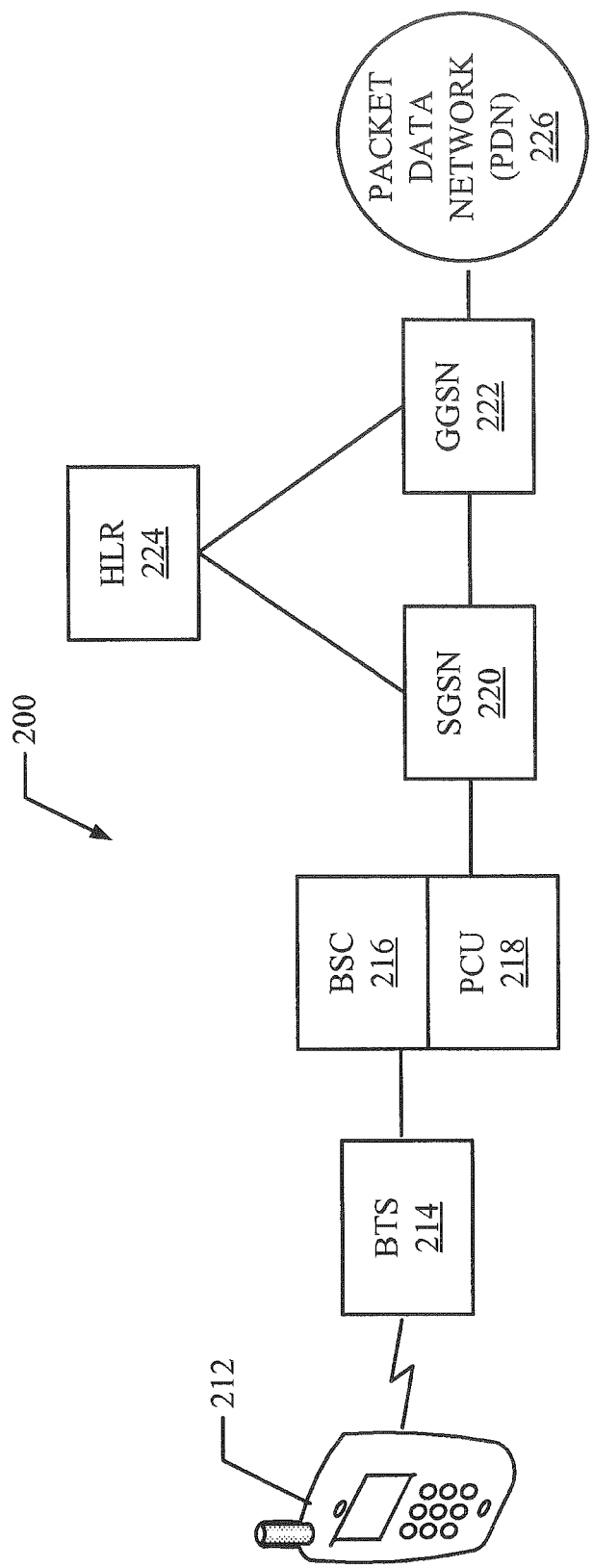
FIG. 2 illustrates a block diagram of an example of a General Packet Radio Service (GPRS) network, in accordance with one embodiment of the invention.

FIG. 2 illustrates a block diagram of a General Packet Radio Service (GPRS) network 200. The network 200 includes a mobile station (MS) 212 in wireless communication with a base transceiver station (BTS) 214. The BTS 214 is in communication with a base station controller (BSC) 216 having coupled thereto a packet control unit (PCU) 218. The PCU 218 is in communication with a serving GPRS support node (SGSN) 220. In one embodiment, the SGSN 220 serves as the intermediate node, described in detail herein below, and the PCU 218 serves as a first secondary node. The SGSN 220 is in communications with both a home location register (HLR) 224 and a gateway GPRS support node (GGSN) 222, which in turn is in communication with a packet data network (PDN) 226. The GGSN 222 may serve as a second secondary node.

Figure 3:
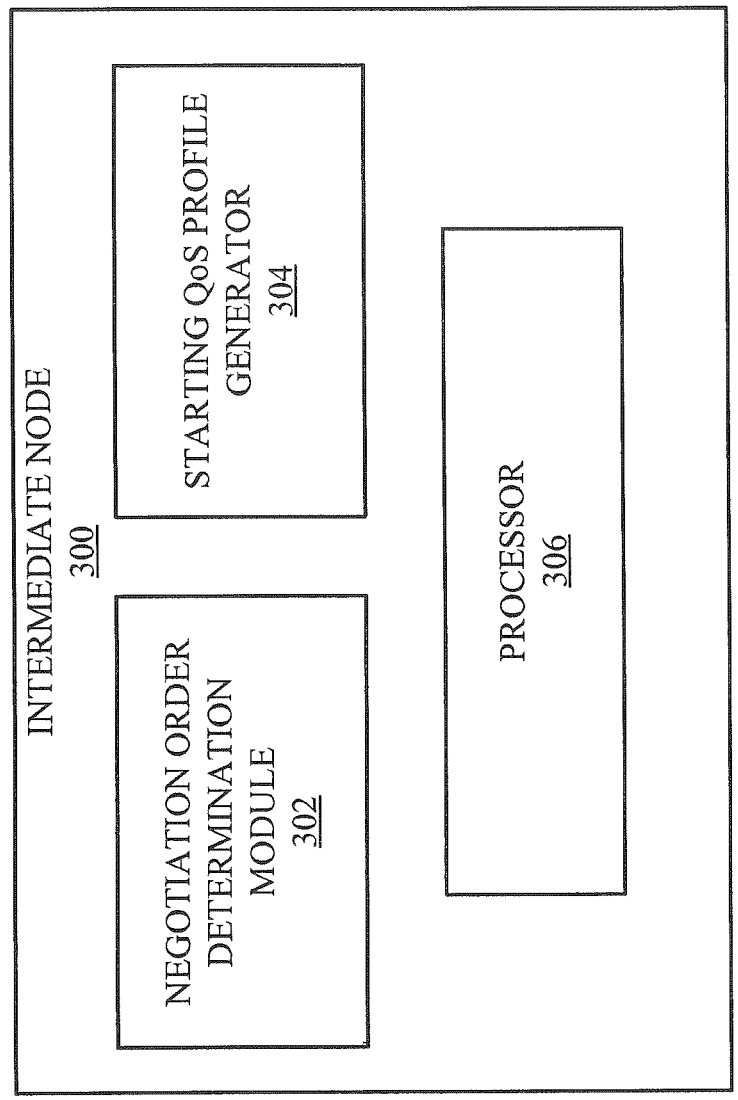
FIG. 3 illustrates a block diagram of an intermediate node for QoS negotiations, according to one embodiment of the invention.

FIG. 3 illustrates a block diagram of an intermediate node 300 for QoS negotiations. In the network 200 of FIG. 2, the intermediate node is represented by SGSN 220. The intermediate node 300 comprises a negotiation order determination module 302 and a starting QoS profile generator 304. In one configuration, the negotiation order determination module 302 will first determine the negotiation order with secondary nodes. Then, the starting QoS profile generator 304 will dynamically generate the appropriate provisional starting QoS profile to be used to begin a negotiation process. The negotiation order determination module 302 and a starting QoS profile generator 304 include a set of instructions executable by processor 306 to perform the processes and functions described below.

Figure 4:
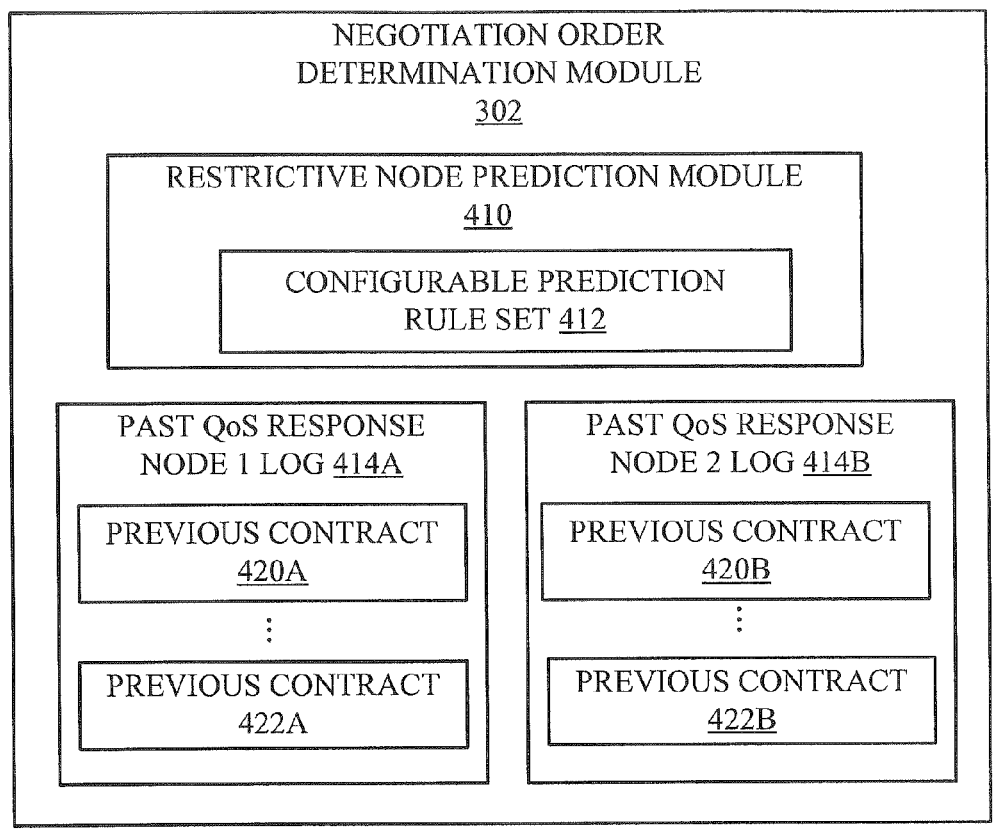
FIG. 4 illustrates a more detailed block diagram of a negotiation order determination module, according to one embodiment of the invention.

FIG. 4 illustrates a more detailed block diagram of negotiation order determination module 302 of FIG. 3. The negotiation order determination module 302 includes a restrictive node prediction module 410 having a configurable prediction rule set 412, a past QoS response node 1 log 414A and a past QoS response node 2 log 414B. Other logs may be generated and stored. However, logs 414A and 414B are described herein for illustrative purposes. The past QoS response node 1 log 414A maintains a record of one or more previous contracts 420A and 422A between the intermediate node 300 and a first one of the secondary nodes. The past QoS response node 2 log 414B maintains a record of one or more previous contracts 420B and 422B between the intermediate node 300 and a second one of the secondary nodes. In addition, other logs of past contracts may be maintained for other secondary nodes.

In operation, the negotiation order determination module 302 is configured to select the negotiation order with the secondary nodes based on certain configurable rules within the prediction rule set 412 and the past QoS responses of those nodes. The secondary node found to be most restrictive by the restrictive node prediction module 410 is selected to begin the negotiation order. For example, a past QoS response may be an accepted past QoS contract for the secondary node.

The configurable prediction rule set 412 will initiate (start) the prediction process based on that secondary node in the past QoS response node 1 log 414A and the past QoS response node 2 log 414B that has been most restrictive in the past. In one configuration, the N in a QoS(N) profile would be based on combining a plurality or all of the available QoS parameters. For example, assume that a service provider offers an "effective guaranteed bit rate" (EGBR) where the EGBR is defined as the bit-rate that must be provided across the Radio Link Control/Medium Access Control (RLC/MAC) protocol in order to support the QoS negotiated with the SGSN 220. The N would also be calculated based on the Guaranteed Bit Rate (GBR) for Streaming or Conversational traffic classes, and the Minimum Throughput Budget Requirement (MTBR) for other classes. To this EGBR a multiplication factor is applied that accounts for the headroom required to provision for the transfer delay requirements and the expected Block Error Rate (BLER) across the Air Interface. Thus, in one configuration, when using the EGBR as a parameter, only the available bandwidth in bits per second (bps) may need to be considered (i.e., a single value to represent the overall QoS requirements). In one configuration, the logs 414A and 414B may store or sort the past QoS responses such that the highest (most restrictive value N) is positioned first in the logs for each respective secondary node. It is possible that the most restrictive past QoS response (e.g., past accepted QoS contract) is the original QoS profile.

If the negotiation order is restricted, then the intermediate node 300 should consider past behavior of the secondary nodes to determine an appropriate initial QoS profile. The expectation is that this would generally be acceptable to all secondary nodes. Thus, the need for re-negotiations is reduced. The term 'restricted' refers to the situation where the GPRS network dictates which secondary node to start the negotiations with (e.g., the SGSN 220 might have to start with the GGSN 222 rather then the PCU 218).

Through the negotiation order prediction process, benefits of a reduced negotiation time can be realized when it is apparent that resources are restricted. Thus, a restricted QoS profile is used as appropriate. However, if there are little to no restrictions, the benefits of a superior or original QoS profile can be offered.

An example of identifying the most restrictive node is shown by a ladder diagram in equation Eq. (1) as follows:

$$QoS(N1) > QoS(N2),$$

$$\text{but } QoS(N2) >> QoS(N3); \text{ and}$$

$$\text{therefore } QoS(N1) >> QoS(N3) \quad \text{Eq. (1)}$$

where 'N' refers to a negotiated QoS parameter, the 'x' of 'Nx' indicates a different negotiation value for QoS parameter N, and N1 is ranked higher than N2 and N3 is ranked lower than N2. For example, suppose that QoS(N1) is what was originally requested. Further suppose that QoS(N2) is associated with the GGSN 222 and that QoS(N3) is associated with the PCU 218. Thus, the PCU 218 was much more restrictive than the GGSN 222 in the past.

In such an instance, the negotiation order determination module 302 would stipulate that the negotiation order should start first with the PCU 218, because the GGSN 222 would likely accept the resulting QoS contract (since the resulting QoS contract is expected to have less restrictive constraints based on past behavior). However, at a current instance in time when negotiations actually begin, the GGSN 222 may turn out to be the most restrictive, in which case the reduced QoS contract would have to be signaled to the PCU 218. Nonetheless, predicting the wrong most restrictive secondary node would be rare. Thus, the negotiation order determination module 302 is configured to predict, based on a past history of the secondary nodes, which secondary node is the most restrictive and to start the negotiations with the node that is expected or predicted to be the most restrictive.

Figure 5:
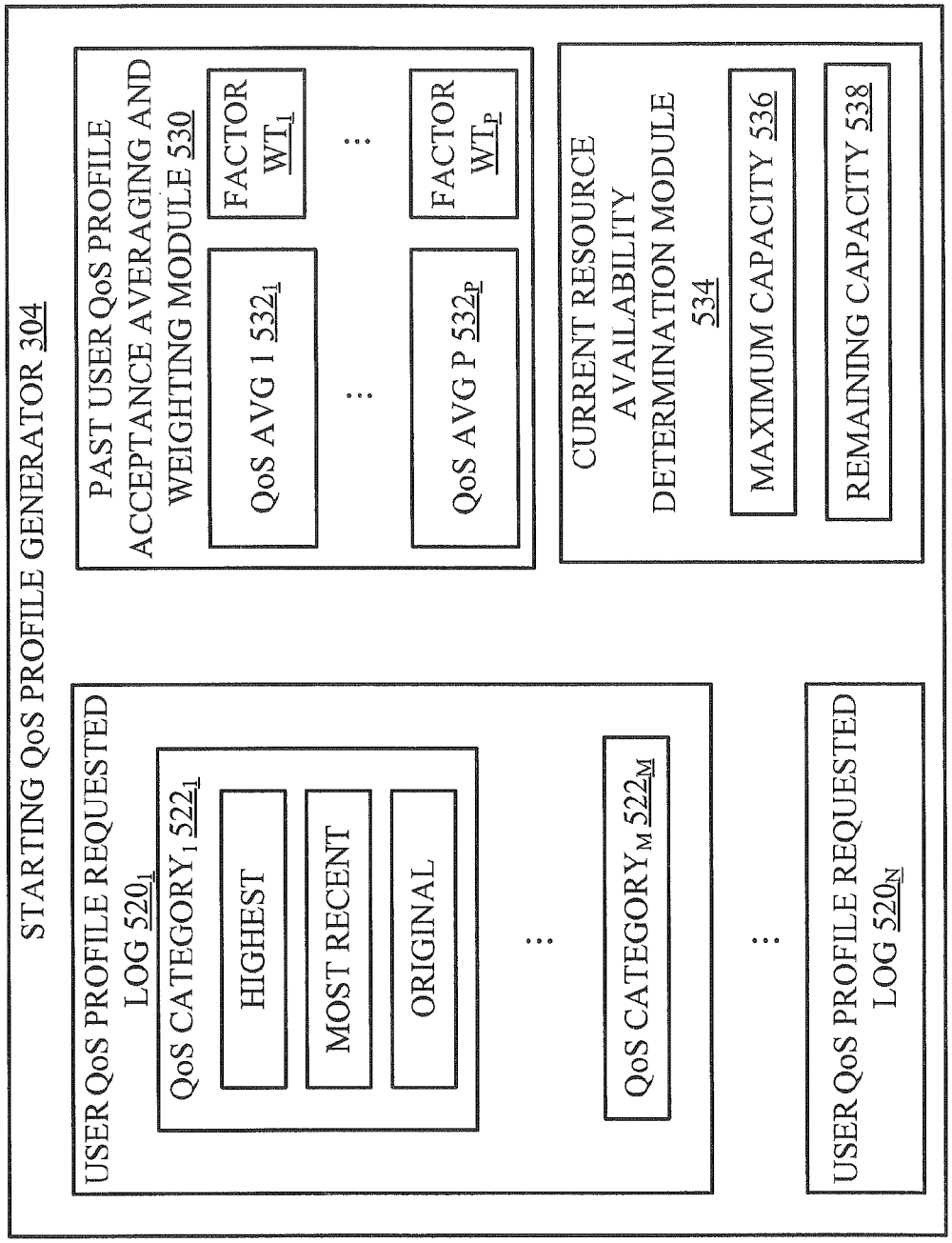
FIG. 5 illustrates a more detailed block diagram of a starting QoS profile generator, according to one embodiment of the invention.

FIG. 5 illustrates a more descriptive block diagram of starting QoS profile generator 304. The starting QoS profile generator 304 may in one configuration always start with the original QoS profile. A list and description of example QoS profile parameters is set forth in Table 1.

TABLE 1

QoS Profile Parameters

| QoS Profile Parameter | Description |
| --- | --- |
| Allocation Retention Priority (ARP) Priority Level Pre-emption Capability Pre-emption Vulnerability Queuing allowed | Indicates the subscriber priority. The ARP can have the values 1 (high priority) to 3 (low priority.) It is provided to the HLR for each PDP context to which a subscriber subscribes. It is defined as a priority for assigning/maintaining radio resources. It should be noted that within the framework of the GPRS support service, this parameter is not transmitted to the BSS; therefore, it is only available at the SGSN and GGSN service node level. |
| Precedence Class | Indicates the priority of a subscriber when it is used. It can have the same values than those of the "Allocation Retention Priority" (ARP) parameter. |
| Traffic Class Conversational (real time) Streaming (real time) Interactive (non real time) Background (non real time) | Indicates the type of service. |
| Traffic Handling Priority (THP) | Allows specifying the priority level of the "Interactive" traffic class. This parameter can have three values. |
| Transfer Delay | Indicates the maximum delay during a packet transfer. It is used only for priority services. |
| Guaranteed bit rate | Indicates the minimum throughput that should be offered throughout packet transfer. It is used only for real time services (i.e., conversational and streaming). |
| Maximum bit rate | Indicates the maximum throughput. |

In terms of the initial QoS profile at which to begin the negotiation process, the simplest approach is to always start with the parameters in the original QoS profile. In a further configuration, a log of the highest QoS parameter requested by (or for) each user in each category, e.g., throughput, (rather than just the most recent or original QoS profile) is maintained for each user. The log may be used to dynamically build a QoS profile for the user to begin the imminent negotiations.

Accordingly, the starting QoS profile generator 304 includes maintains a record of a plurality of user QoS profile requested logs $520_1$-$520_N$ for N users. For each user, there would be a database of the "toughest" (most difficult to meet) QoS parameters requested. Each user QoS profile requested log $520_1$-$520_N$ has one or more QoS categories or parameters $522_1$-$522_M$. Each QoS category or parameter $522_1$-$522_M$ may include a log of the highest QoS parameter requested by (or for) each user, the most recent QoS parameter requested by (or for) each user and the original QoS parameter of the original QoS profile.

The starting QoS profile generator 304 would use the user QoS profile requested logs $520_1$-$520_N$ as the starting point for any future negotiations or contracts by selecting appropriately the stored entry for one of the "highest," "most recent" or "original" value for the QoS category or parameter that is closest to or below the same parameter of the restrictive node. The highest and most recent entries may be stale or out-of-date. If the highest and/or most recent entries are stale (out-of-date), then the original value can be selected. This ensures that the user achieves the highest possible QoS level for each of their contracts, thereby overcoming the current highlighted issue whereby a new user contract could be established based on an old more restricted QoS profile. A key output at the end of the starting QoS profile generation process is a dynamically generated provisional starting QoS profile for use in QoS negotiations with secondary nodes, where the provisional starting QoS profile increases the likelihood of a rapidly accepted final QoS profile negotiated during the QoS negotiations.

The starting QoS profile generator 304 further includes a past user QoS profile acceptance averaging and weighting module 530 having a plurality of QoS profile averages $532_1$-$532_P$ that were accepted by the user and a corresponding time-constrained weighting factor denoted by $WT_1$-$WT_P$. The starting QoS profile generator 304 also includes a current resource availability determination module 534.

After the provisional starting QoS profile has been generated using the user QoS profile requested log, the next step is to determine whether this initial provisional starting QoS profile is appropriate based on past (historical) experience. For example, the provisional starting QoS profile may not be accepted by the secondary nodes, as was seen in previously where QoS(N1)>>QoS(N3). Thus, the starting QoS profile generator 304 uses two additional metrics based on the user and the overall system.

The starting QoS profile generator 304 uses the plurality of QoS profile acceptance averages $532_1$-$532_P$ that were accepted by the user to modify the starting QoS profile. The plurality of QoS profile acceptance averages $532_1$-$532_P$ are weighted by a corresponding time-constrained weighting factor denoted by $WT_1$-$WT_P$, where the weighting factors are time-constrained as a function of a time duration. Hence, the plurality of QoS profile averages $532_1$-$532_P$ are individually discounted over time. As a simple illustration, assume that the QoS(N) profiles over time are time stamped such as QoS(N1, t1), QoS(N2, t3), QoS(N3, t7), etc. where t1, t3 and t7 represent recorded time. Thus, the weighting factor could be lit where t increases over time for N1, N2 and N3, respectively. Accordingly, the further away in time the less influence the parameter will have. Nevertheless, other tunable ways of discounting past values may be used.

Then, the starting QoS profile generator 304 determines and compares the current system loading or capacity to one or more of the QoS parameters in the provisional starting QoS profile to ensure that all of the parameters can be supported. For example, the starting QoS profile generator 304 may determine how much guaranteed throughput has already been allocated by the intermediate node compared to a maximum capacity 536 of the system or intermediate node or whatever capacity constraint is appropriate. This would allow the remaining capacity 538 or available resources to be calculated. These constraints should then be applied or compared with the starting QoS profile to determine whether the initial or starting values should be further restricted. The resulting QoS profile is used as the final provisional starting QoS profile for the current negotiations to begin.

Figure 6:
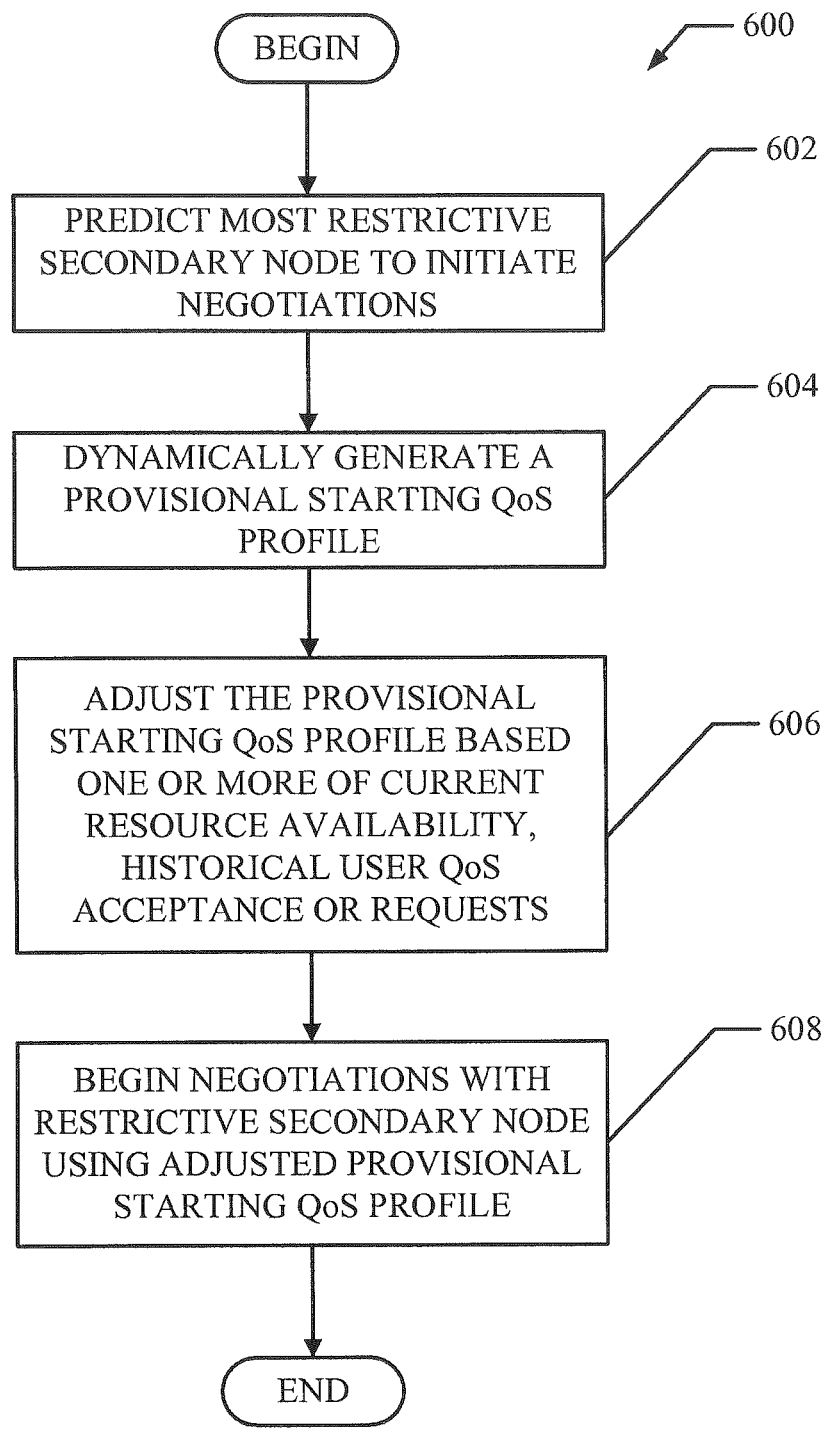
FIG. 6 illustrates a flowchart of an intermediate node Quality of Service (QoS) pre-negotiation process, according to one embodiment of the invention.

FIG. 6 is a flowchart illustrating a method by which the above process of the illustrative embodiment is completed, and more particularly illustrating an intermediate node Quality of Service (QoS) pre-negotiation process 600. Although the method illustrated in FIG. 6 may be described with reference to components shown in FIGS. 2-5, it should be understood that this is merely for convenience and alternative components and/or configurations thereof can be employed when implementing the various methods.

The pre-negotiation process 600 begins with step 602 where the intermediate node predicts the most restrictive secondary node to initiate negotiations. At step 604, the intermediate node dynamically generates a provisional starting QoS profile for a specific connection based on the most restrictive secondary node. The provisional starting QoS profile may be a function of past requested QoS parameters for (or by) the user. At step 606, the provisional starting QoS profile is adjusted based on one or more of current resource availability and historical user QoS acceptance or requests. In one configuration the starting QoS profile may be based on the requested parameters and then adjusted by past acceptances by the user. Alternately, the starting QoS profile for a specific connection may be based first on the past acceptances and then subsequently adjusted by past requested parameters. At step 608, negotiations begin with the restrictive secondary node using the final provisional starting QoS profile.

Through implementation of the pre-negotiation process 600, the benefits of a reduced negotiation time can be realized when resources are limited by restricting the QoS profile (which is then likely to be accepted without the need for multiple negotiation steps). However, when such limits are not deemed to be present, the optimum (maximum) or original QoS profile can be attempted (and again the expectation is that this QoS profile would most likely be accepted). In addition, the number of negotiation steps are minimized by selecting the secondary node with the most restricted perceived available resources first in the negotiation sequence.

In the flowchart above, in some implementations, certain steps of the processes may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Figure 7:
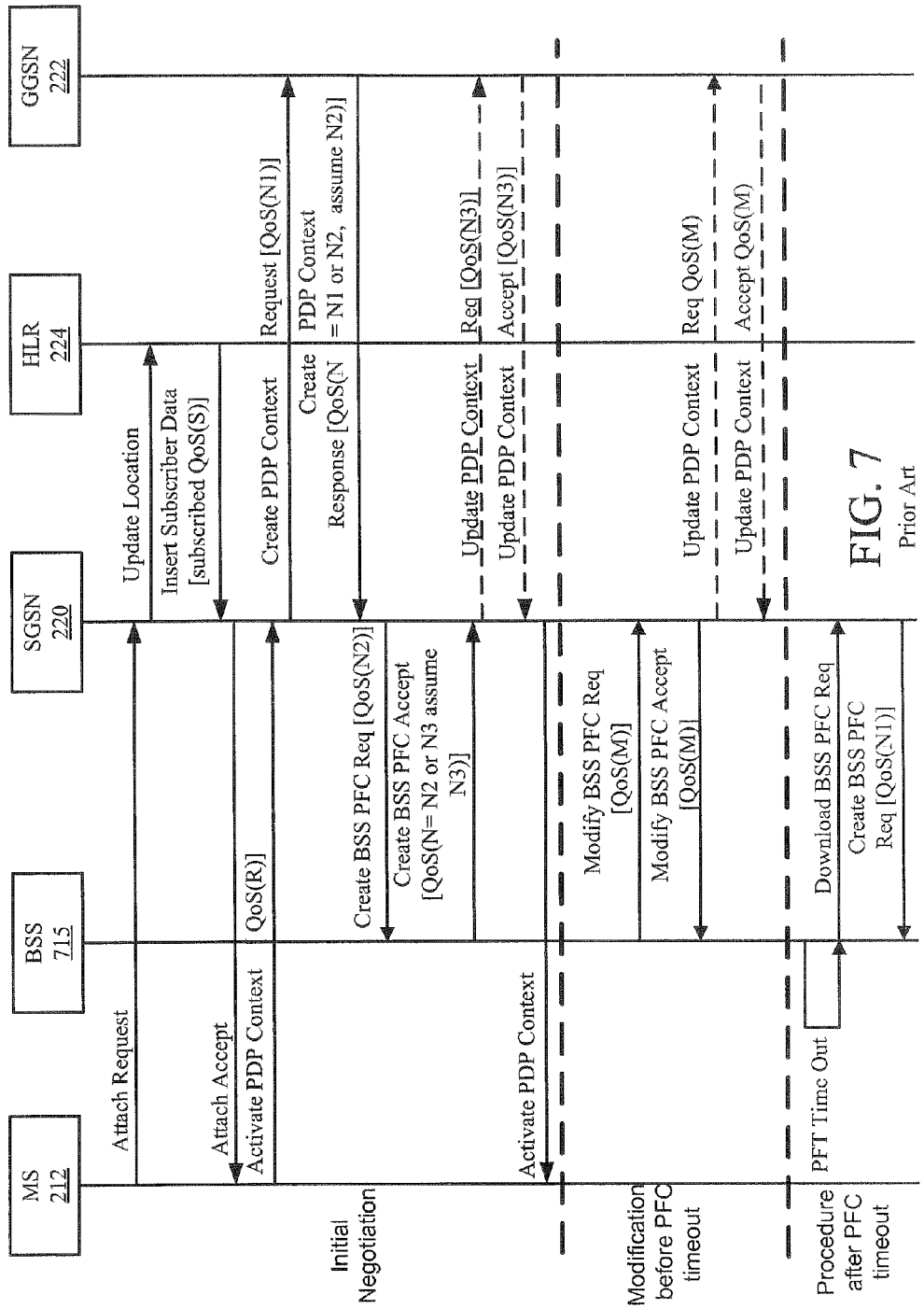
FIG. 7 is an example of a conventional negotiation process of a GPRS network.

FIG. 7 is an example of a conventional negotiation process of a GPRS network implemented with reference to the components of network 200 illustrated in FIG. 2. The MS 212 initiates a message with an attached request for service. The request from the MS 212 is sent to the intermediate node which in the present example is SGSN 220. The intermediate node (SGSN 220) generates an update location message which is sent to the HLR 224. The HLR 224 sends an insert subscriber data message back to the SGSN 220. The insert subscriber data message includes a subscribed QoS(S) having been registered in advance in the HLR 224. The SGSN 220 in response sends an attach accept message to the MS 212. The SGSN 220 also will compare the subscribed QoS(S) to the QoS requested by the mobile. The intermediate node SGSN 220 logs the subscribed QoS(S) and the current QoS request appropriately.

The MS 212, in response to receiving the attached accept message, sends an activate PDP-Context message with a QoS (R) included therein to the intermediate node (SGSN 220), where the 'R' in QoS(R) refers to a specific mobile requested QoS parameter. The SGSN 220 creates a Create-PDP-Context Request with a QoS(N1) included therein to GGSN 222. Here, the N in QoS(N1) refers to a negotiated QoS parameter and Nx refers to different negotiation values. For example, the N1 value is the same as R, but N1 is from the SGSN's point of view. The GGSN 222 sends a Create-PDP-Context Response with QoS(N=N1 or N2) back to the SGSN 220. On the assumption that the outcome was QoS(N2), the SGSN 220 then communicates a Create BSS-PFC Request message with QoS(N2) included therein to the Base Station Subsystem (BSS) 715. The BSS 715 generates a Create BSS-PFC Accept message with QoS(N=N2 or N3) back to the SGSN 220 or intermediate node. Thus, the BSS 715 may accept the QoS (N2) or change to QoS(N3). On the assumption that the outcome was QoS(N3), the intermediate node (SGSN 220) sends an Update PDP-Context Request message with QoS (N3) to the GGSN 222. In response the GGSN 222 sends an Update PDP-Context Accept message with QoS(N3) back to the SGSN 220, indicating that the GGSN can support the QoS(N3). To complete the procedure, the SGSN 220 sends to the MS 212 an activate PDP Context Accept message with QoS(N3) signaled therein.

If after a Packet Flow Context (PFC) is created, there is a change in the PFC resulting in a corresponding change in the QoS, the BSS 715 may send a modified BSS PFC Request message with QoS(M) signaled therein to the SGSN 220 to upgrade/downgrade the QoS, where 'M' refers to a modified QoS parameter. The SGSN 220 sends to the BSS 715 a modify BSS PFC Accept with QoS(M) signaled therein. The intermediate node (SGSN 220) sends an Update PDP-Context Request message with QoS(M) to the GGSN 222. In response the GGSN 222 sends an Update PDP-Context Accept message with QoS(M) signaled back to the SGSN 220. After a PFC timer times out, the BSS 715 may send a download BSS PFC Request to the SGSN 220. The SGSN 220 sends a create BSS PFC request message with QoS(N1) signaled therein. Here it is assumed the SGSN 220 has replied with the originally requested QoS profile, which would then enable the BSS 715 to offer the highest possible QoS level.

As illustrated by FIG. 6, the conventional pre-negotiation process 600 requires multiple exchanges of QoS parameters between an intermediate node and each of multiple secondary nodes as the intermediate node endeavors to negotiate a QoS that is acceptable to all. By contrast, the multiple QoS parameter exchanges may be avoided when there is opportunity to modify the QoS profile as a result of determining, in the pre-negotiation process 600, that QoS(N3) should be used to begin (initiate) the negotiation process. That is, the pre-negotiation process can reduce a length/duration of the QoS negotiations by determining an appropriate QoS profile and/or a most restrictive node with which to initiate the QoS negotiations. In addition, in the prior art, the intermediate node may impose a currently negotiated QoS contract whilst the PFC timer is running, having discarded the original QoS requested by the mobile/network, thus effectively preventing a secondary node from increasing the offered QoS by imposing an already downgraded QoS profile. In that case, a secondary node such as a PCU can not upgrade the QoS towards the originally requested QoS profile. By contrast, the pre-negotiation process 600 of FIG. 6 can identify when the originally requested QoS profile still could be offered prior to a PFC timer time out.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software/logic, those skilled in the art will appreciate that the software aspects of an illustrative embodiment of the present invention are capable of being distributed as a program product in a variety of forms.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. Are used to distinguish one element from another.

What is claimed is:

1. A system comprising:
 a plurality of secondary nodes; and
 an intermediate node in communication with a plurality of secondary nodes, the intermediate node being configured to:
  maintain a record of a plurality of quality of service (QoS) profile logs for a plurality of users, and
  if a negotiation order is restricted, dynamically generate a provisional QoS profile to begin a negotiation process, the provisional QoS profile being based on a most restrictive secondary node.

2. The system according to claim 1, wherein the intermediate node generates the provisional QoS profile for a specific connection a network dictates which secondary node to start negotiations with.

3. The system according to claim 1, wherein generating the provisional QoS profile is performed as a function of historical requested QoS parameters associated with a specific user.

4. The system according to claim 3, wherein the intermediate node is further configured to adjust the provisional QoS profile based on at least one of: past user QoS acceptance or requests of at least one of the plurality of secondary nodes, and current resource availability.

5. The system according to claim 3, wherein the intermediate node is configured to adjust the provisional QoS profile based on past accepted averages of QoS parameters and current system loading.

6. The system according to claim 5, wherein the intermediate node is configured to apply a weighting factor to the past accepted averages of QoS parameters as a function of time.

7. The system according to claim 1, wherein the intermediate node is configured to predict a most restrictive secondary node of the plurality of secondary nodes and start the QoS negotiation with the predicted most restrictive secondary node.

8. In a communication system, a method comprising:
 maintaining, by an intermediate node, a record of a plurality of quality of service (QoS) profile logs for a plurality of users; and
 if a negotiation order is restricted, dynamically generating, by the intermediate node, a provisional QoS profile to begin a negotiation process, the provisional QoS profile being based on a most restrictive secondary node.

9. The method according to claim 8, wherein the
 dynamically generating the provisional QoS profile is performed when a network dictates which secondary node to start negotiations with.

10. The method according to claim 8, wherein:
 dynamically generating the provisional QoS profile is performed as a function of historical requested QoS parameters by or for a specific user.

11. The method according to claim 10, further comprising:
 adjusting the provisional QoS profile based on at least one of past user QoS acceptance or requests of at least one of the plurality of secondary nodes, and current resource availability.

12. The method according to claim 10, further comprising:
 adjusting the provisional QoS profile based on past accepted averages of QoS parameters and current system loading.

13. The method according to claim 12, further comprising:
 applying a weighting factor to the past accepted averages of QoS parameters as a function of time.

14. The method according to claim 8, further comprising:
 predicting which secondary node of the plurality of secondary nodes is most restrictive for a QoS negotiation; and
 starting the QoS negotiation with the secondary node predicted as the most restrictive.

15. A non-transitory computer-readable medium storing instructions executable by a processor for performing a method comprising:
 maintaining a record of a plurality of quality of service (QoS) profile logs for a plurality of users; and
 if a negotiation order is restricted, dynamically generating a provisional QoS profile to begin a negotiation process, the provisional QoS profile being based on a most restrictive secondary node.

16. The non-transitory computer-readable medium of claim 15, wherein the dynamically generating the provisional QoS profile is performed when a network dictates which secondary node to start negotiations with.

17. The non-transitory computer-readable medium of claim 15, wherein dynamically generating the provisional QoS profile is performed as a function of historical requested QoS parameters by or for a specific user.

18. The non-transitory computer-readable medium of claim 17, the method further comprising:
  adjusting the provisional QoS profile based on at least one of current system loading and past accepted averages of QoS parameters.

19. The non-transitory computer-readable medium of claim 18, the method further comprising:
  applying a weighting factor to the past accepted averages of QoS parameters as a function of time.

20. The non-transitory computer-readable medium of claim 15, the method further comprising:
  predicting which secondary node of the plurality of secondary nodes is most restrictive for a QoS negotiation; and
  starting the QoS negotiation with the secondary node predicted as the most restrictive.

* * * * *